(12) United States Patent
Binnebose et al.

(10) Patent No.: US 6,547,196 B2
(45) Date of Patent: Apr. 15, 2003

(54) ANCHOR STRUCTURE AND METHOD

(75) Inventors: Craig Binnebose, Mason City, IA (US); Ronald E. Bull, Mason City, IA (US)

(73) Assignee: IMI Cornelius Inc., Anoka, MN (US)

( * ) Notice: Subject to any disclaimer, the term of this patent is extended or adjusted under 35 U.S.C. 154(b) by 0 days.

(21) Appl. No.: 10/057,100

(22) Filed: Oct. 26, 2001

(65) Prior Publication Data

US 2002/0174620 A1 Nov. 28, 2002

Related U.S. Application Data

(60) Provisional application No. 60/244,080, filed on Oct. 27, 2000.

(51) Int. Cl.[7] .............................................. F16M 11/16
(52) U.S. Cl. .................. 248/188; 248/188.8; 108/531.3
(58) Field of Search .............................. 248/188, 188.8, 248/188.9, 188.1; 108/156, 158; 312/351.3, 351.1; 403/265, 266, 267

(56) References Cited

U.S. PATENT DOCUMENTS

| | | | | |
|---|---|---|---|---|
| 4,745,867 A | * | 5/1988 | Niemiec | ...................... 108/158 |
| 4,807,838 A | * | 2/1989 | Anderson | ................ 248/188.1 |
| 4,838,440 A | * | 6/1989 | Thompson | ................... 248/188 |
| 5,121,891 A | * | 6/1992 | Goldsmith | ............... 248/188.8 |
| 5,568,708 A | * | 10/1996 | Kassardjian et al. | ........... 52/301 |
| 5,688,287 A | * | 11/1997 | Cline | ............................. 5/310 |
| 5,906,344 A | * | 5/1999 | Atkinson et al. | ........ 248/188.9 |

* cited by examiner

Primary Examiner—Ramon O. Ramirez
Assistant Examiner—Kofi Schulterbrandt
(74) Attorney, Agent, or Firm—Sten Erik Hakanson

(57) ABSTRACT

The present invention comprises a sheet metal leg retaining anchor having an upturned perimeter flange edge. The perimeter edge includes a plurality of holes there through and a threaded nut is secured centrally thereof. In the illustrative embodiment the anchor is placed within a roto-molded mold for the particular leg supported structure/cabinet being produced therein. The upturned perimeter flange edges are oriented to extend into the mold, that is, in the opposite direction from what will be the bottom end of the structure/cabinet from which the legs will extend. The bin is then formed by the roto-molding process whereby the plastic material flows over and around the exposed surfaces of the anchor. Specifically, the plastic flows through the holes in the perimeter flange edges providing for a strong mechanical locking or securing of the anchor to and with the plastic structure/cabinet. The legs are threadably engaged with the anchor and firmly anchored thereby to the structure/cabinet.

1 Claim, 4 Drawing Sheets

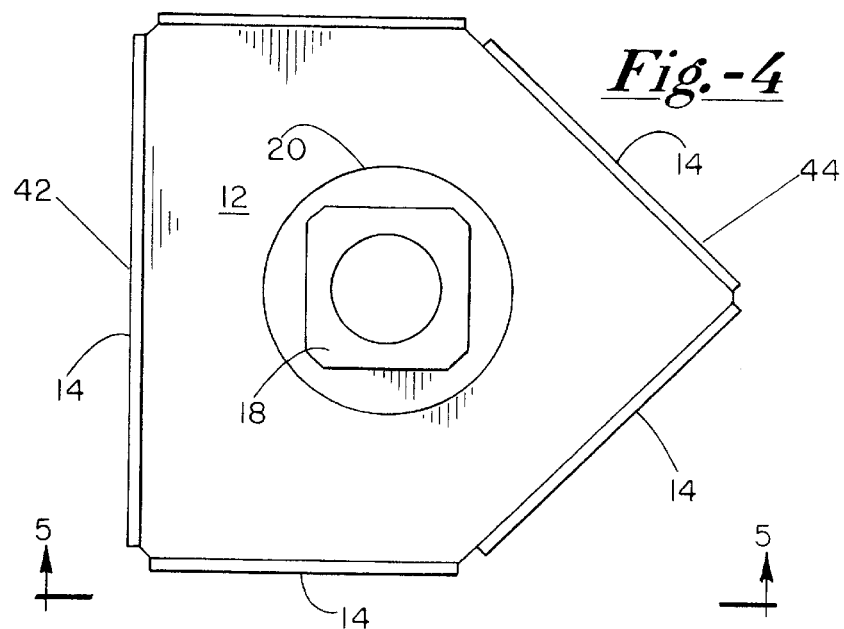
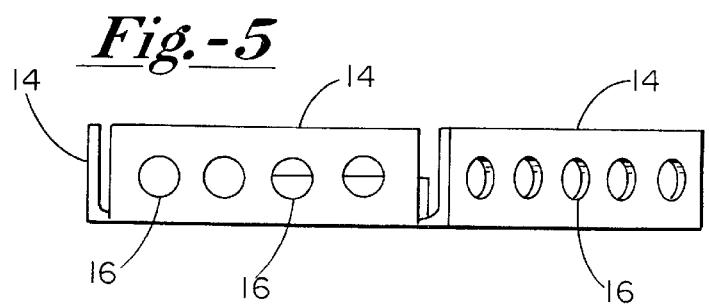
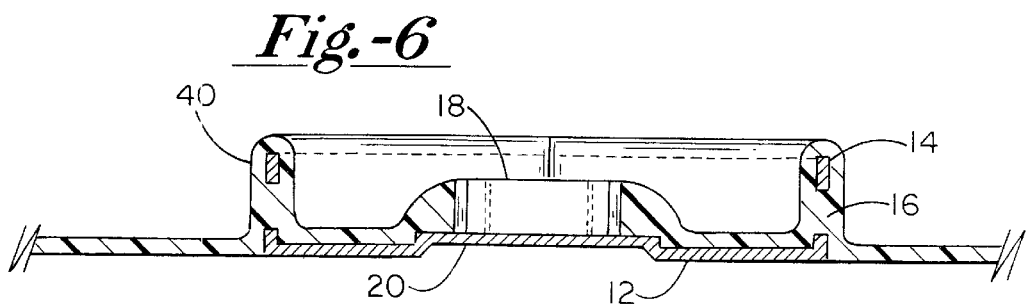

ANCHOR STRUCTURE AND METHOD

This application claims the benefit of Provisional application No. 60/244,080 filed Oct. 27, 2000.

BACKGROUND OF THE INVENTION

1. Field of the Invention

The present invention relates generally to object retaining or anchoring members, and more particularly to such members as are molded within a flow able or formable material that subsequently hardens there around.

2. Background

Many structures are formed by the subsequent hardening of a material such as cement or various types of plastics or epoxies. Such structures are often formed by a mold and also can include anchor structures that may extend from the molded structure and/or serve as a means to retain a further object to the molded structure. An example would include a plastic molded structure requiring support legs where the legs are threadably engaged with the structure after its formation. A particular example would be seen in a roto-molded ice bin structure used to retain therein a volume of ice. During the roto-molding formation thereof it is known to include leg-retaining anchors at the four corners of the base end thereof. These anchors include a retaining means such as a threaded nut to which the legs can be threadably engaged subsequent to the molding process. However, a problem with prior art leg anchors of this type can be the load strength limit thereof. Leg anchors as are known today can become loose from torsional and linear weight forces applied thereto whereby the surrounding plastic can be stretched and deformed. As a result, the anchor can become loose and even detach from the surrounding plastic rendering the leg useless. Accordingly, it would be desirable to have an object retaining anchor that is more securely attached to the plastic molded structure and more resistant to any forces tending to pull it loose therefrom.

SUMMARY OF THE INVENTION

The present invention comprises an anchor that in an exemplary embodiment comprises a sheet metal plate having an upturned flange surface extending around a perimeter thereof. The perimeter flange includes a plurality of holes there through and the plate has a threaded nut secured centrally thereof. In one application, the anchor herein is placed within a roto-molded mold for the structure being produced, such as, an ice-retaining bin. Thus, one anchor is placed in each of the four corners of what will be the base of the bin. Each anchor is secured to the bottom of the mold by a bolt anchored through corresponding holes in the mold base and screwed to and engaged with the central threaded nut. The flanges are oriented to extend into the mold, that is, in the opposite direction from what will be the bottom end of the base from which the legs will extend. The bin is then formed by the roto-molding process whereby the plastic material flows over and around the exposed surfaces of the anchor. Specifically, the plastic flows through the holes in the perimeter flanges providing for a strong mechanical locking or securing of the anchor to and with the plastic. Those of skill will understand that the flowing of the plastic through and around the flange holes provides for a mechanically stronger engagement between the plastic and the anchor as compared to a situation where there only exists surface area to surface area contact there between. After the roto-molding process is completed, the retaining bolts are removed and the bin is removed from the mold. It is then possible to attach the legs by threadable engagement with the central threaded nuts of the anchors. The anchors of the present invention were found to provide for surprising improvements in the strength and durability thereof. Destructive testing failed to cause separation of the anchor from the immediately surrounding and covering plastic.

DESCRIPTION OF THE DRAWINGS

A better understanding of the structure, operation and the objects and advantages of the present invention can be had by reference to the following detailed description which refers to the following figures, wherein:

FIG. 4 shows a top plan view of the anchor of the present invention.

FIG. 5 shows a side plan view along lines 5—5 of FIG. 4.

FIG. 6 shows a cross sectional view along lines 6—6 of FIG. 3.

DETAILED DESCRIPTION OF THE PREFERRED EMBODIMENT

Figure 1:
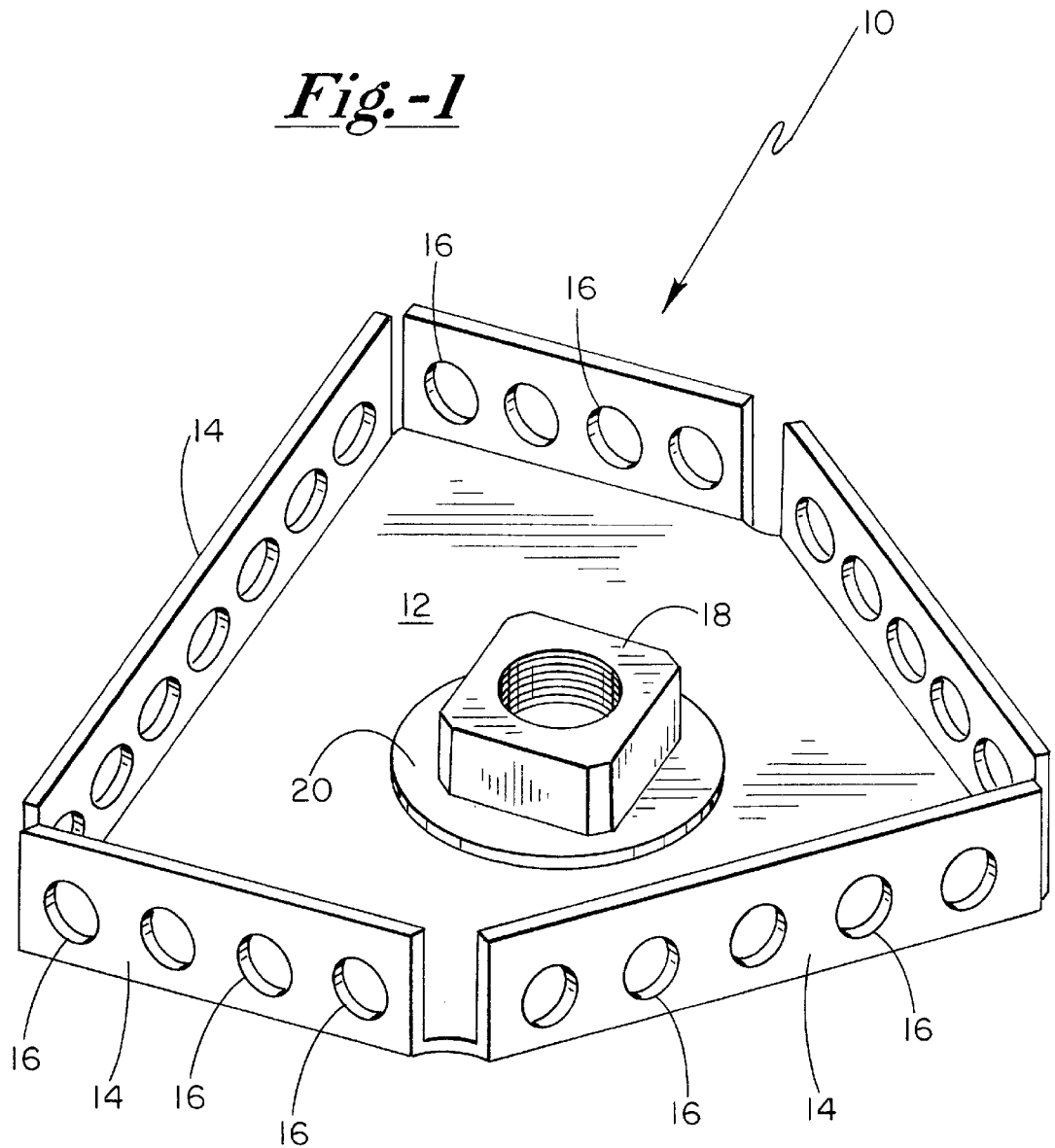
FIG. 1 shows a perspective view of the anchor of the present invention.

The retaining anchor of the present invention is seen in the various figures and referred to generally by the numeral 10. Anchor 10 can be manufactured from a suitable sheet metal stock and includes a plate 12 having a surface area surrounded by a plurality of individual upturned perimeter edge flanges 14. Each flange has a plurality of plastic flow holes 16 there through and is oriented at an angle transverse to the surface area of plate 12. A threaded nut 18 is secured to a reverse side of an embossed or recessed area 20 of plate 10 located substantially centrally thereof.

Figure 7:
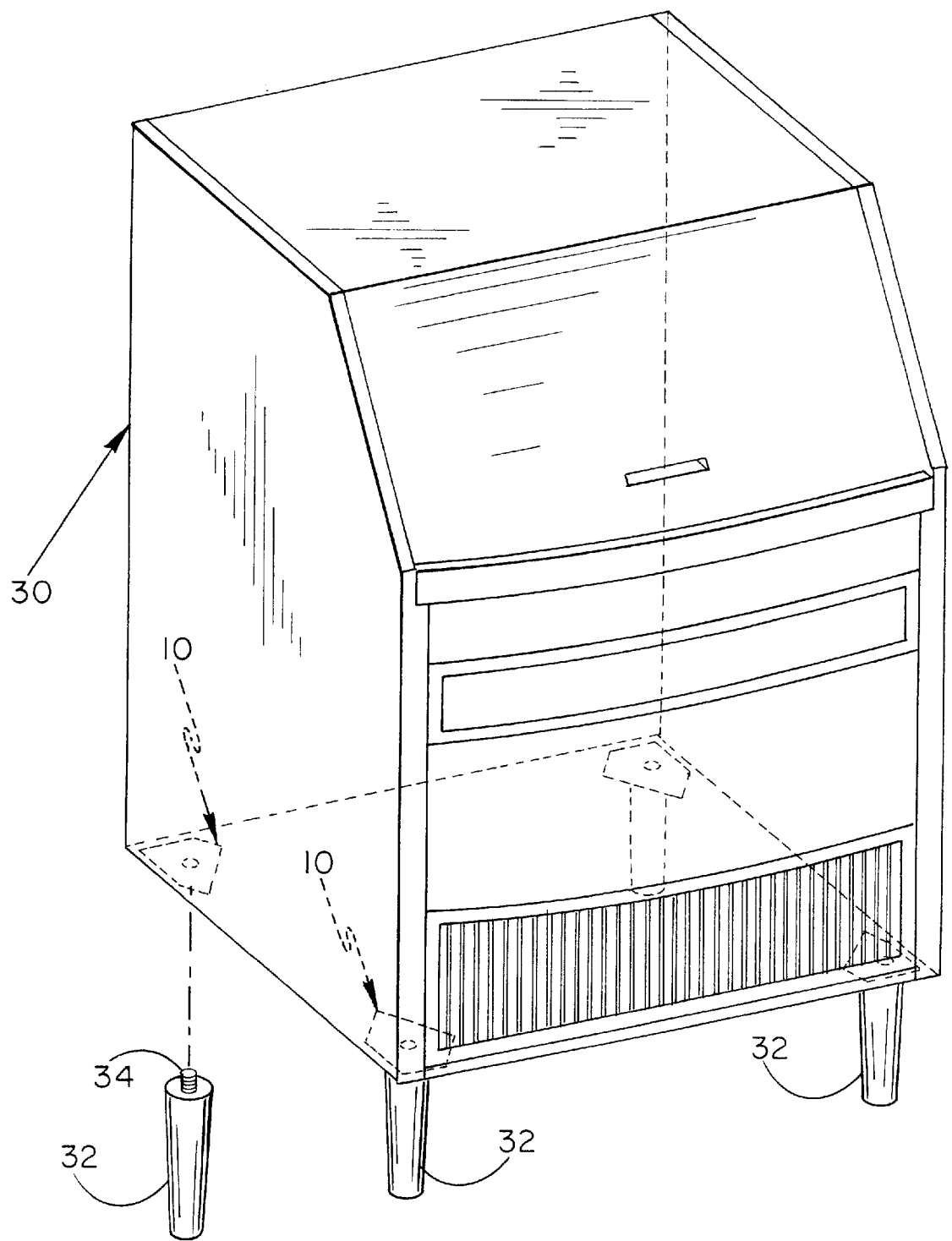
FIG. 7 shows a perspective partially exploded environmental view of the anchors of the present invention as used in an ice bin of an ice-making machine.

As seen in FIG. 7, anchor 10 is designed to be formed into the base of a roto-molded cabinet, such as, cabinet 30 of an ice making and storage machine. Four anchors 10 are molded into the cabinet 30 during the manufacture thereof and serve as leg retaining structures at each of the four corners of the bottom end of cabinet 30. Each leg 32 includes a threaded central rod 34 for providing threaded engagement with anchors 10.

Figure 2:
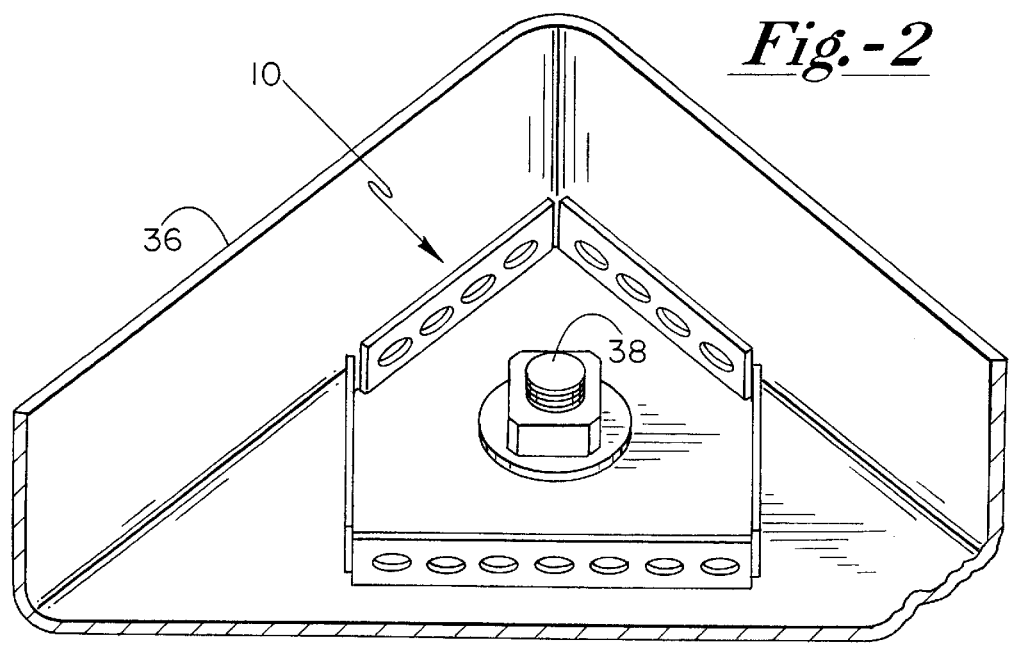
FIG. 2 shows a perspective view of the anchor of the present invention in position in a roto-mold.
Figure 3:
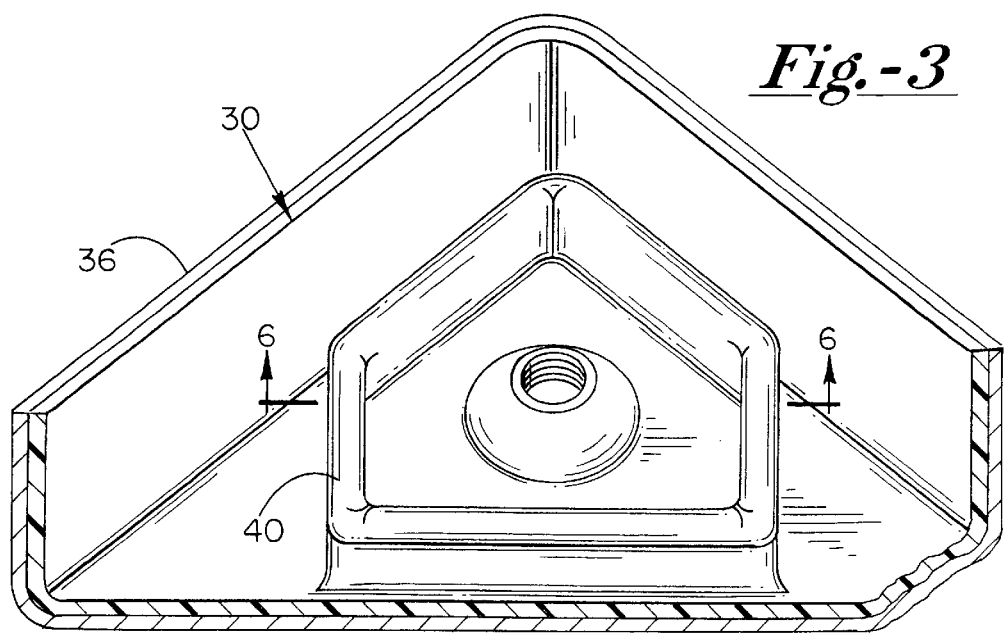
FIG. 3 shows a perspective view of the anchor of the present invention in position in a roto-mold after the roto-molding process.

The manufacture of the present invention can be understood by reference to FIGS. 2, 3 and 6. Anchors 10 are first placed within a mold 36 and each secured thereto by a bolt 38 extending through corresponding holes, not shown, in the mold 36. The roto-molding process, well known in the art, is then commenced and when completed, a layer of plastic 40 has covered the outer surface of each anchor 10. FIG. 3 shows this completion stage wherein the bolt 38 and any associated plastic thereon has been removed. As seen in FIG. 6, wherein it will be understood that cabinet 30 has been removed from mold 36, it can be appreciated that plastic material 40 has not only covered anchor 10, but has also flowed through holes 16 of flanges 14.

It was found that the flow of the material 40 through holes 16 provided for dramatically improved anchoring of anchor 10 to cabinet 40. In the preferred form of anchor 10, it is five sided in the form of a baseball "home plate" having both a rectangular end 42 and triangular end 44. The triangular end 44 is oriented to correspond with each base corner 46 of cabinet 30. The surface area of anchor 10 within the perimeter edges 12 thereof is selected with respect to the size of cabinet 30 and the weight that legs 32 must bear.

In one embodiment for use with a roto-molded icemaker/storage bin made of polyethylene, each of the four anchors 10 are made of 12 gauge galvanized steel, the flanges having a height of approximately ⅔ of an inch, and the overall surface area thereof being approximately 9 square inches. The icemaker/storage bin has a rectangular base area of approximately 575 square inches, wherein the four legs are required to support a weight well in excess of 200 pounds. Of course, those of skill will appreciate that the dimensions of anchor 10 need to be varied depending on the weight supported, and the torsional and other load forces to which the support legs and anchors will be subjected. In that regard, it can also be appreciated that the anchor of the present invention need not necessarily be made of metal. Various other material including composites, ceramics, and plastics could serve as suitable anchor material, particularly where corrosion may be a concern. Of course, attachment means other than a threaded nut, such as, a various types of clamps and clips, bayonet fittings, friction fit approaches and the like could be used. And, it can also be understood, that the anchor of the invention herein could have the "functional" part, such as the leg, comprising an integral part thereof where that functional portion thereof simply extends from the completed molded structure. Moreover, it can be understood that plate 12 need not be flat but could include various types of undulations and could also include various holes 16.

Those of skill will further appreciate that the anchor of the present invention can be used to hold a variety of objects, other than support legs, that are required to be firmly and securely retained in and/or extend from an object. Moreover, that object need not necessarily be roto-molded as shown in the exemplary embodiment. It can be understood that the anchors made in accordance with the spirit and scope of the present invention as detailed in the claims herein below, can be held within a variety of materials that can flow there around and there through and subsequently harden such anchor in place. Thus anchors 10 could be formed in concrete or within a plastic injection molded part. It will also be clear that a wide variety of geometric shapes for the anchor of the present invention other than the illustrative pentagonal embodiment may be utilized, including, but not limited to; rectangular, triangular or circular shapes.

What is claimed is:

1. An anchor for retention in a structure, the structure made of a material formable around the anchor for retaining the anchor therein, the anchor comprising:
   a plate having a surface area and having a perimeter edge,
   a perimeter edge flange that extends along at least a portion of the plate perimeter edge and transversely thereto and the perimeter edge flange including one or more material flow holes there through, and the plate having means for retaining an object thereto.

* * * * *